United States Patent
Yamamoto

(10) Patent No.: US 10,088,150 B2
(45) Date of Patent: Oct. 2, 2018

(54) CARBONIZED MATERIAL PRODUCTION KILN

(71) Applicant: YAMAMOTO BIO-CHARCOAL MFG. CO., LTD., Masuda-shi, Shimane (JP)

(72) Inventor: Akio Yamamoto, Masuda (JP)

(73) Assignee: YAMAMOTO BIO-CHARCOAL MFG. CO., LTD., Masuda (JP)

( * ) Notice: Subject to any disclaimer, the term of this patent is extended or adjusted under 35 U.S.C. 154(b) by 446 days.

(21) Appl. No.: 14/906,411

(22) PCT Filed: Jul. 26, 2013

(86) PCT No.: PCT/JP2013/070306
§ 371 (c)(1),
(2) Date: Jan. 20, 2016

(87) PCT Pub. No.: WO2015/011828
PCT Pub. Date: Jan. 29, 2015

(65) Prior Publication Data
US 2016/0160125 A1    Jun. 9, 2016

(51) Int. Cl.
*F23B 90/06* (2011.01)
*F27D 1/00* (2006.01)
(Continued)

(52) U.S. Cl.
CPC .............. *F23B 90/06* (2013.01); *C10B 1/02* (2013.01); *C10B 47/02* (2013.01); *C10B 49/02* (2013.01);
(Continued)

(58) Field of Classification Search
CPC .......... F23B 90/06; F23B 10/02; F27D 1/003; C10B 47/02; C10B 49/02; C10B 1/02;
(Continued)

(56) References Cited

FOREIGN PATENT DOCUMENTS

| JP | S38-20473 Y1 | 10/1963 |
|---|---|---|
| JP | H06-16451 U | 3/1994 |

(Continued)

OTHER PUBLICATIONS

Aug. 27, 2013 International Search Report issued in International Patent Application No. PCT/JP2013/070306.
(Continued)

*Primary Examiner* — David J Laux
(74) *Attorney, Agent, or Firm* — Oliff PLC

(57) ABSTRACT

To enable a carbonized material production kiln to be maintained in a simple manner when an exposed surface on a side wall of the kiln is cracked, to prevent the kiln from easily cracking by heat to thereby prolong the life of the kiln itself, and to increase heat retention efficiency to thereby increase carbonization efficiency even during periods of cold temperatures such as the winter season. The carbonized material production kiln is formed by stacking cubic concrete blocks each having no reinforcing iron so that recombination of up to six faces of each cubic concrete block becomes possible, wherein a heat storage/retention member such as stones is filled in an exhaust space formed between a kiln floor iron plate and a kiln bottom so as to store heat, thereby preventing a decrease in carbonization efficiency even at cold temperatures.

5 Claims, 9 Drawing Sheets

(51) Int. Cl.
  *F23M 5/02*   (2006.01)
  *F23B 10/02*  (2011.01)
  *F23G 5/027*  (2006.01)
  *C10B 47/02*  (2006.01)
  *C10B 49/02*  (2006.01)
  *C10B 1/02*   (2006.01)
  *C10B 53/02*  (2006.01)

(52) U.S. Cl.
  CPC .............. *C10B 53/02* (2013.01); *F23B 10/02* (2013.01); *F23G 5/0273* (2013.01); *F23M 5/02* (2013.01); *F27D 1/003* (2013.01); *F23G 2201/303* (2013.01); *F23G 2202/103* (2013.01); *F23M 2700/0053* (2013.01); *Y02E 50/14* (2013.01)

(58) Field of Classification Search
  CPC .. C10B 53/02; F23M 2700/0053; F23M 5/02; F23G 2201/303; F23G 2202/103; F23G 5/0273; Y02E 50/14
  See application file for complete search history.

(56) References Cited

FOREIGN PATENT DOCUMENTS

| | | |
|---|---|---|
| JP | 2000-044963 A | 2/2000 |
| JP | 2000-319675 A | 11/2000 |
| JP | 2004-238460 A | 8/2004 |
| JP | 2004-307702 A | 11/2004 |
| JP | 2007-056237 A | 3/2007 |
| JP | 2010-043218 A | 2/2010 |
| JP | 2010-265469 A | 11/2010 |
| JP | 5117548 B2 | 1/2013 |

OTHER PUBLICATIONS

Feb. 4, 2016 International Prelminary Report on Patentability issued in International Patent Application No. PCT/JP2013/070306.

(A)

(B)

(A)

(B)

CARBONIZED MATERIAL PRODUCTION KILN

TECHNICAL FIELD

The present invention relates to a technical field of carbonized material production kiln capable of continuously making a large amount of carbonized materials in a single carbonizing operation step.

BACKGROUND ART

Generally, carbonized materials such as wood charcoal, bamboo charcoal, coconut shell charcoal, and palm empty fruit bunch charcoal for which various plants including wood, bamboo, coconut shells, and palm empty fruit bunches have been carbonized have porous structures and exhibit excellent adsorption functions, and therefore have been widely used not only for fuels but also in various industrial fields, without being limited to consumers fields, of moisture absorbing materials, deodorizing materials, water quality improving materials, adsorbing materials, etc. Therefore, providing high-quality carbonized materials having constant adsorbing functions has been demanded. Now, as methods for making such carbonized materials, carbonized material production kilns provided as movable types are conventionally known (refer to Patent Documents 1 and 2), but there has been a problem that because of being a movable type, the carbonized material production kiln has a small capacity and cannot therefore produce a large amount of carbonized materials at one time. Therefore, carbonized material production kilns provided as stationary types so as to produce a large amount of carbonized materials at one time are known (refer to Patent Documents 3 and 4).

However, because either type of these performs a step of producing carbonized materials in a closed manner, not only a fire hole and a ceiling cover are required, but a new raw material supply according to a volume reduction is also virtually impossible when raw materials are reduced in volume with carbonized material production, and only raw materials loaded at first can be carbonized, so that there is still a problem in the point of producing a large amount of carbonized materials.

Therefore, the inventor of the present invention has developed an open-type carbonized material production kiln and proposed one that allows newly adding raw materials according to a volume reduction, when raw materials are reduced in volume with carbonized material production (refer to Patent Document 5).

PRIOR ART DOCUMENTS

Patent Documents

Patent Document 1: Japanese Published Unexamined Patent Application No. 2000-319675
Patent Document 2: Japanese Published Unexamined Patent Application No. 2000-44963
Patent Document 3: Japanese Published Unexamined Patent Application No. 2004-238460
Patent Document 4: Japanese Published Unexamined Patent Application No. 2004-307702
Patent Document 5: Japanese Patent No. 5117548

SUMMARY OF THE INVENTION

Problems to be Solved by the Invention

Moreover, because of being an open type without a ceiling, the carbonized material production kiln disclosed in Patent Document 5 allows newly loading raw materials with a volume reduction of raw materials, which has enabled producing a large amount of carbonized materials in a single step of carbonized material production. Now, in this carbonized material production kiln, because of the assumption of performing operations such as raw material loading and evening-out using a traveling work machine such as a dump truck, a wheel loader, or a hydraulic shovel, a wall that forms a periphery of the kiln is formed of concrete in a fixed manner and an iron plate drilled with vent holes is laid on a kiln bottom in a state of keeping an exhaust space from a kiln floor surface so that exhaust gas (smoke) generated by carbonization is discharged from a smoke tower disposed in a corner of the kiln through the exhaust space.

In this carbonized material production kiln, however, a peripheral wall may be damaged due to being struck or the like by the traveling work machine against the peripheral wall, and when a part of the concrete that constitutes the peripheral wall includes reinforcing iron, the peripheral wall may also be damaged by cracking due to heat during carbonized material production because the reinforcing iron and concrete are different in thermal expansion coefficient, and repair of the peripheral wall is virtually impracticable when such damage has occurred, so that there is a problem with the kiln having a short life.

Further, in this carbonized material production kiln, because the exhaust space between the iron plate on the kiln bottom and the kiln floor surface is hollowed, there is a problem that the carbonization temperature in the kiln falls to lower the carbonization speed in winter, on a severely cold morning or evening, while raining or snowing, or the like, and problems to be solved by the present invention reside in these problems.

Means for Solving the Problems

The present invention has been created in order to solve such problems in view of the circumstances as described above, and a first aspect of the present invention is a carbonized material production kiln including an open ceiling surface, side walls at four faces being in a quadrangular shape, an exhaust space which is formed between an iron plate with a vent hole opened that is laid as a kiln floor in a state of being enclosed by the side walls and a kiln bottom surface and through which exhaust gas discharged as a result of carbonization of a raw material for carbonization, a combustion device being made to communicate with the discharge space and for combusting exhaust gas, and a stage which is continuous to at least one side wall of the side walls and on which a traveling work machine can travel at the same height as that of an upper surface of the side wall, wherein for repeatedly performing making a moisture percentage of a raw material for carbonization to be loaded into the production kiln be that in an unseasoned wood state to cause a film of steam generated with accelerated carbonization of the raw material for carbonization to shut off outside air, pressing an upper surface of the raw material for carbonization loaded in the production kiln into a state of an outside air shut-off to accelerate carbonization, and newly loading a raw material for carbonization a moisture percentage of which is made to be that in an unseasoned wood state according to a volume reduction with the accelerated carbonization in order to enable producing a large amount of carbonized materials in a single step of carbonized material production, the side wall is formed by stacking blocks each being in a cubic shape and made of concrete without reinforcing iron in plural numbers horizontally and vertically to thereby make an exposed surface on the kiln side wall changeable by recombination of the surface of a block, and in the exhaust space between the iron plate of the kiln floor and the kiln bottom surface, a heat storage/retention member is filled in a ventable state.

A second aspect of the present invention is the carbonized material production kiln according to the first aspect of the present invention, for which a plurality of production kilns are provided adjacent to each other via a partition side wall, said partition side wall to provide a partition between the adjacent production kilns being constructed wide by stacking blocks like a plurality of rows widthwise so as to allow a traveling work machine to travel.

A third aspect of the present invention is the carbonized material production kiln according to the second aspect of the present invention, in which the combustion device and the exhaust space are connected to communicate with each other via a ventilation flue provided with an opening and closing plate that is freely openable and closable.

A fourth aspect of the present invention. is the carbonized material production kiln according to the third aspect of the present invention, in which the combustion device is provided in the partition side wall.

A fifth aspect of the present invention is the carbonized material production kiln according to the third aspect of the present invention, in which the combustion device is provided at a position facing the partition side wall of at least one production kiln of the plurality of production kilns, and the exhaust space of a production kiln without the combustion device and the combustion device are connected to communicate with each other via a ventilation flue provided in the partition side wall and provided with an opening and closing plate that is freely openable and closable.

Adopting the first aspect of the present invention can provide a production kiln characterized by the following. By being loaded with raw materials a moisture percentage of which has been made to be that in an unseasoned wood state a plurality of times from the side of the open ceiling surface, while the production kiln is capable of producing a large amount of carbonized materials in a single step of carbonized material production by pressing an upper surface of the raw materials for carbonization to shut off outside air in conjunction with a film of steam generated during carbonization, in a case such that an exposed surface on a kiln side wall is damaged due to traveling or bumping of the traveling work machine, the production kiln allows recombining the surface of a block being in a cubic shape to thereby enable recombination of up to six faces and is thus excellent in maintainability. Moreover, the block can be prevented from cracking by a difference in thermal expansion because the block is without reinforcing iron, which thus allows providing the production kiln with a long life. Furthermore, by the heat storage/retention member filled in the exhaust space, the temperature in the production kiln can be maintained at a high temperature even during periods of cold temperatures such as the winter season, during rain fall, etc., which allows accelerating carbonization.

Adopting the second aspect of the present invention enables continuously producing a larger amount of carbonized materials using the plurality of production kilns adjacent to each other via the partition side wall.

Adopting the third aspect of the present invention eliminates entry of outside air into the combustion device through the exhaust space of a production kiln that is not in the process of carbonization production, which allows efficiently combusting exhaust gas from a production kiln that is performing carbonization production.

Adopting the fourth aspect of the present invention allows efficiently combusting by the combustion device only exhaust gas from a production kiln that is performing carbonization production.

Adopting the fifth aspect of the present invention allows combusting exhaust gas generated from a production kiln other than one production kiln using the combustion device provided for the one production kiln.

MODES FOR CARRYING OUT THE INVENTION

Figure 1:
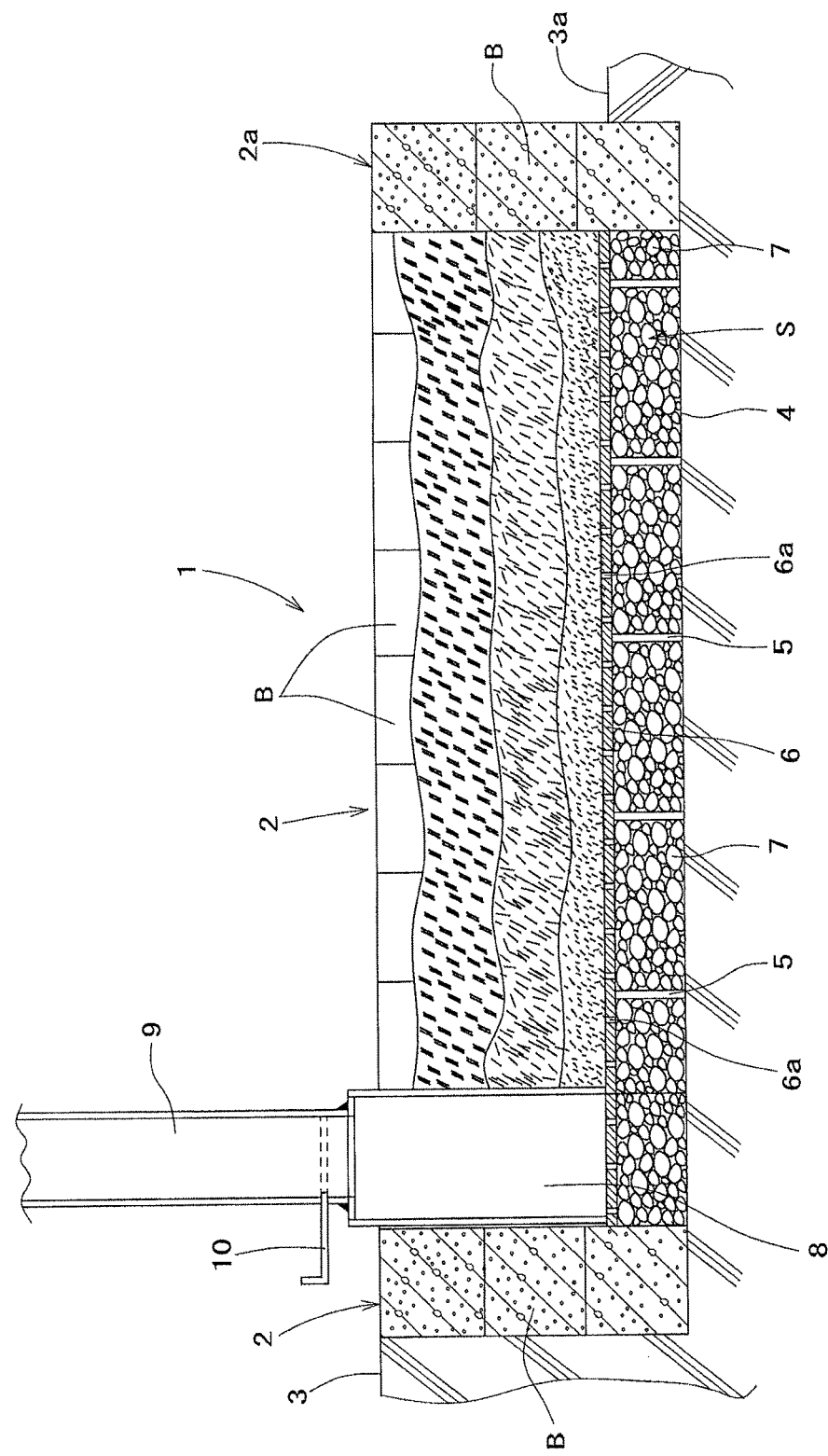
FIG. 1 is a schematic longitudinal sectional view of a carbonized material production kiln.
Figure 2:
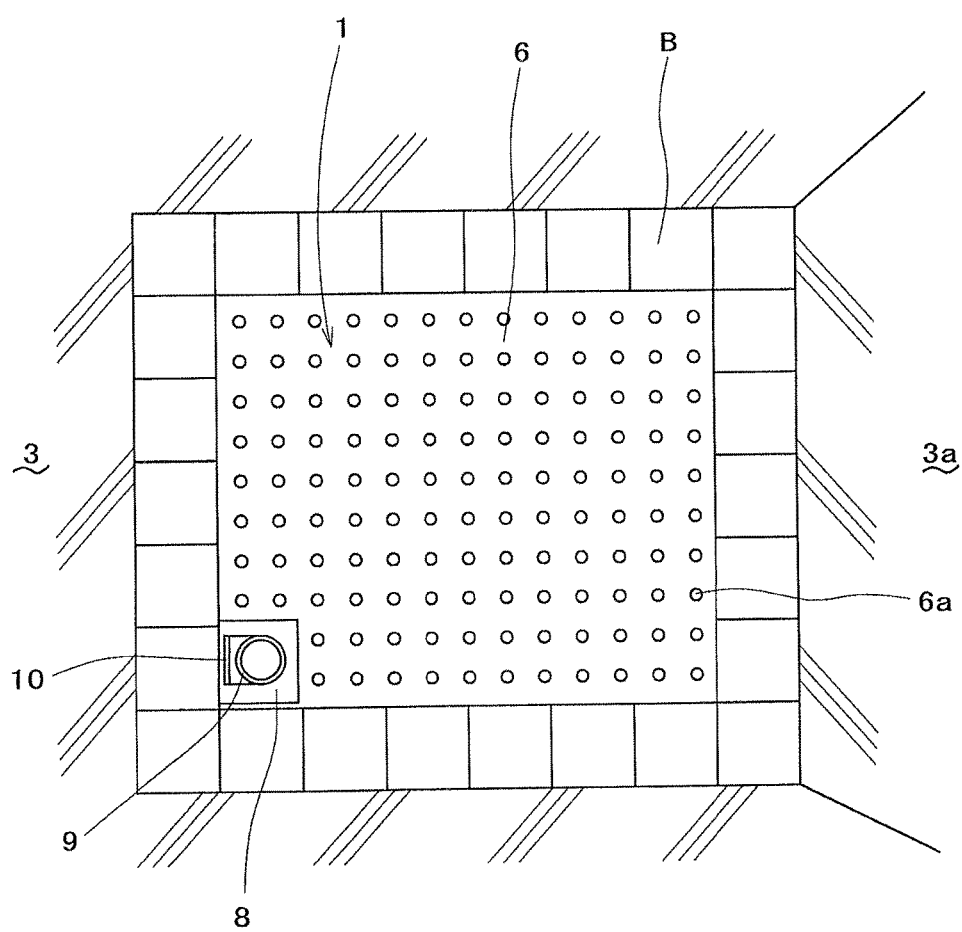
FIG. 2 is a schematic plan view of the carbonized material production kiln.
Figure 3:
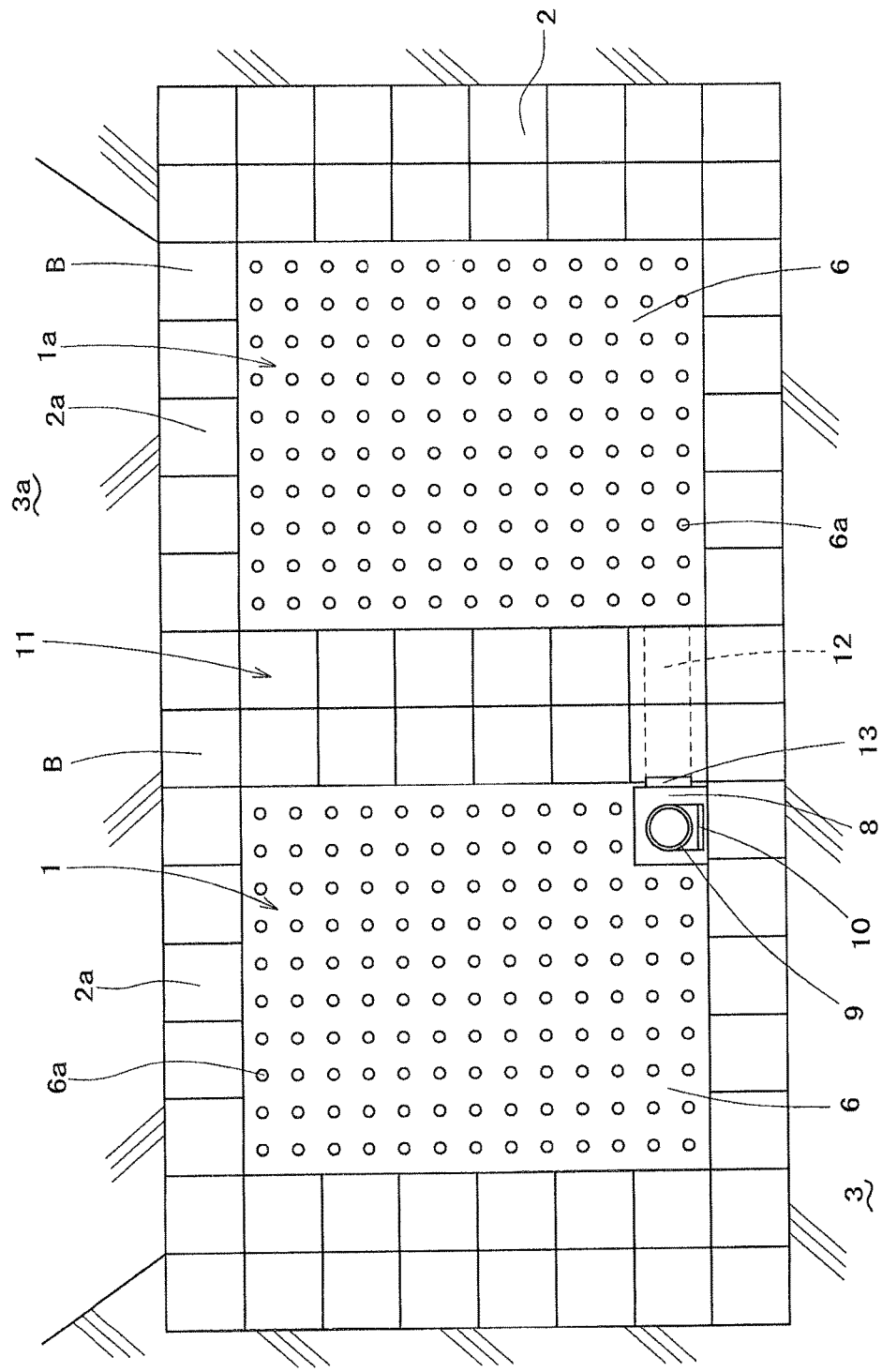
FIG. 3 is a plan view of a carbonized material production kiln of a second embodiment.
Figure 4:
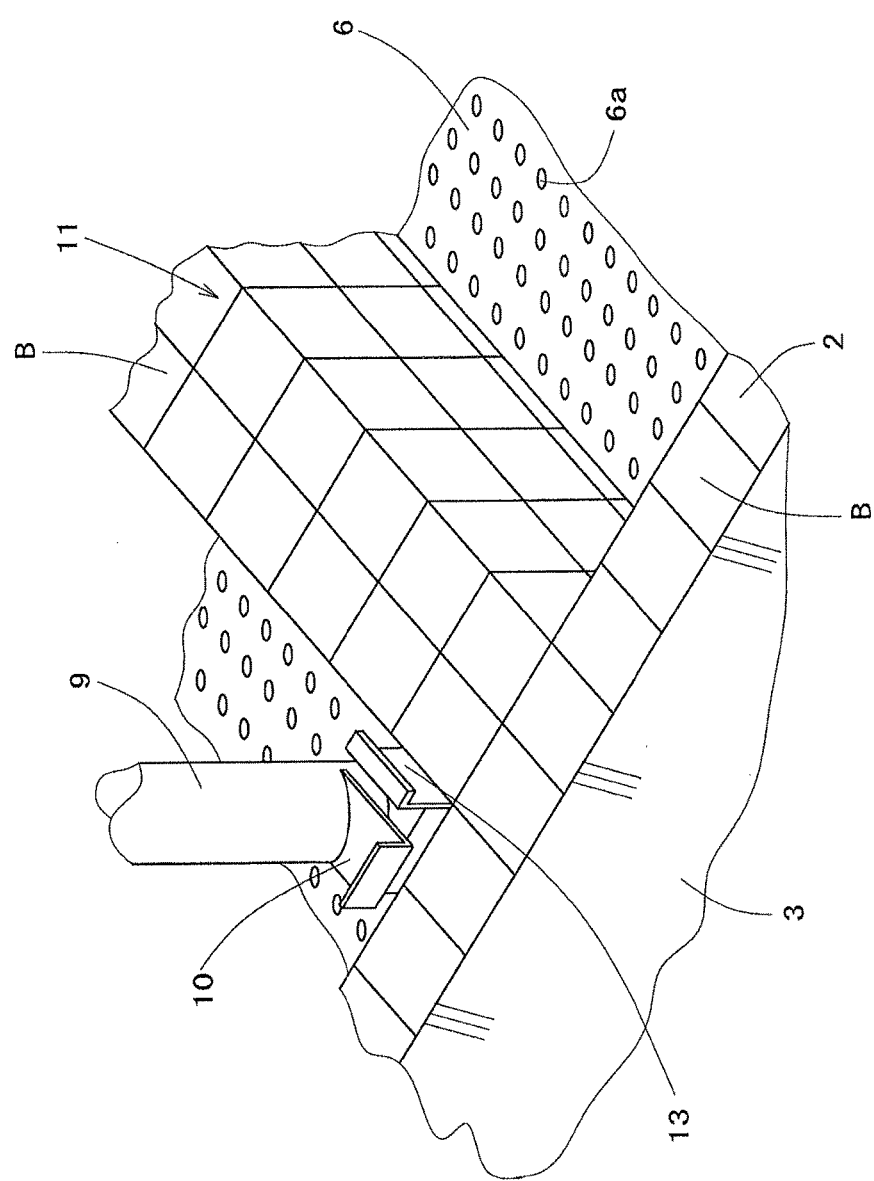
FIG. 4 is a perspective view of a main part of the carbonized material production kiln of the second embodiment.
Figure 5:
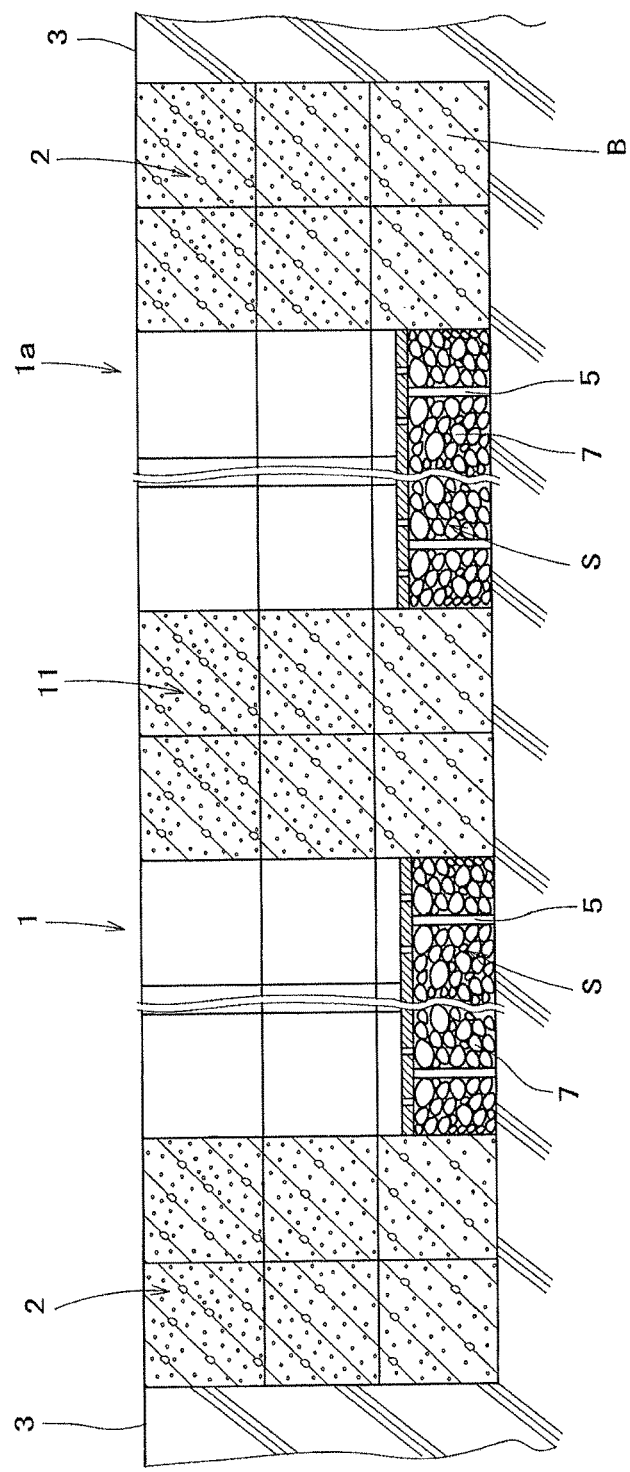
FIG. 5 is a longitudinal sectional view of a main part of the carbonized material production kiln of the second embodiment.
Figure 6:
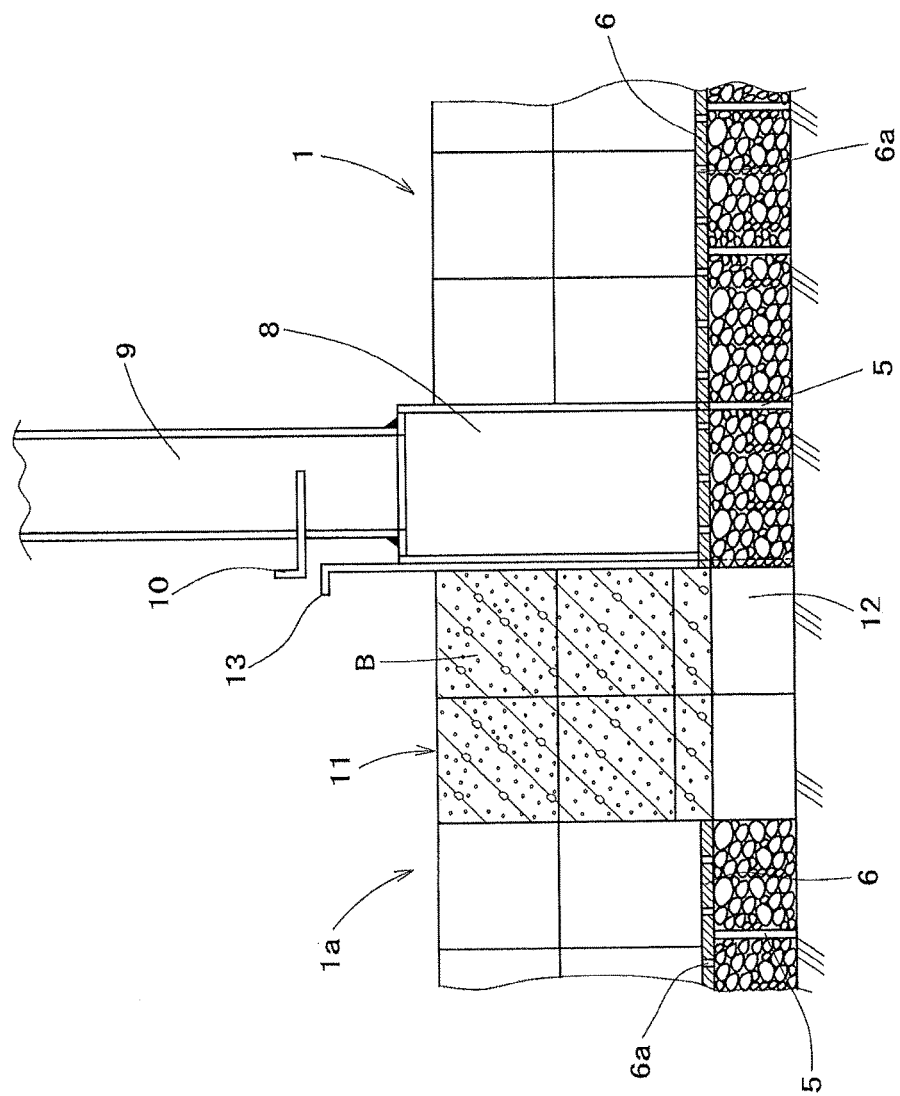
FIG. 6 is a longitudinal sectional view of a main part of the carbonized material production kiln of the second embodiment.

Next, embodiments of the present invention will be described with reference to the drawings. In the drawings, reference numeral 1 denotes a carbonized material production kiln. The production kiln 1 is open at its ceiling surface, and has side walls 2 and 2a at four peripheral sides formed by stacking solid concrete-made blocks B without reinforcing iron vertically and horizontally. Each block B is in a cubic shape having six square faces on its outer periphery. A first embodiment shown in FIG. 1 and FIG. 2 includes a single production kiln 1, for which the blocks B are stacked in plural numbers in a height direction and front-rear and right-left directions (in the present embodiment, three blocks are stacked in the height direction, and appropriate numbers of blocks are stacked in the front-rear and right-left directions) and side walls 2 and 2a at four peripheral sides of which are formed in a state. Of these side walls 2 and 2a, an outer side surface of at least one side wall 2 (in the present embodiment, outer side surfaces of three side walls 2) is continuous to a high-level first stage 3 maintained to have a height equal to that of an upper end edge of the side wall 2. The first stage 3 allows a traveling work machine such as a dump truck, a wheel loader, or a hydraulic shovel to move so as to be able to perform a necessary operation at a height equal to that of the side wall 2. In this connection, the traveling work machine can move onto the side wall 2 to perform a necessary operation.

On the other hand, an outer side surface of the remaining side wall 2a is without such a high-level first stage 3, and is adjacent to a low-level second stage 3a equal to a kiln bottom surface of the production kiln 1 to be described later. In the present embodiment, the second stage 3a is set slightly lower than upper surface of bottom blocks B. Moreover, on this second stage 3a, the blocks B of the side wall 2a can be removed to form an entrance/exit when taking out carbonized materials produced in the production kiln 1 or when performing maintenance of the production kiln 1, so as to allow the above-mentioned traveling work machine that is being driven to enter into the production kiln 1 and perform a necessary operation inside the production kiln 1.

A kiln bottom surface 4 of the production kiln 1 is set at a height equal to that of a lower surface of bottom blocks B, supports 5 are disposed in the front-rear and right-left with predetermined intervals kept therebetween, and on an upper ends of the support 5, an iron plate 6 to serve as a kiln floor with vent holes (exhaust holes) 6a drilled with predetermined intervals kept therebetween in the front-rear and right-left is laid. An exhaust space S is thereby formed between the kiln bottom surface 4 and the kiln floor iron plate 6, and the exhaust space S is filled with a heat storage/retention member 7 made of ballast-like pebble or brick, or the like in a ventable state.

In one corner of the production kiln 1, a combustion device 8 for combusting exhaust gas (smoke) is provided. The combustion device 8 combusts exhaust gas having passed through the exhaust space S, and a stack 9 provided on an upper portion of the combustion device 8 is provided with a shutter (block plate, shut-off plate) 10 for adjusting the amount of ventilation (exhaust amount) and for blocking (shutting off) air. Moreover, performing an adjustment in the amount of ventilation by the shutter 10 allows performing control to prevent raw materials for carbonization from reaching a combusting state as a result of excessively sucking exhaust gas during a carbonizing operation and closes the shutter 10 so as to shut off the amount of ventilation at the time of extinguishing after the end of carbonization.

Next, description will be given of an operation to produce carbonized materials. This operation is basically in line with the description of Patent Document 5 in the above. First, the blocks B that constitute the side wall 2a are appropriately removed to open an entrance/exit, and after raw materials for carbonization are carried in therefrom using a traveling work machine and laid all over the kiln floor iron plate 6 so as to reach an even state, the entrance/exit is blocked using the removed blocks B. The shutter 10 is brought into a fully open state in that state, and the laid raw materials for carbonization are entirely ignited by an ignition means such as a torch. When the raw materials for carbonization have then turned red into a glowing ember state, all over the same, raw materials for carbonization are newly laid into an even state from the first stage 3 using the traveling work machine. An initial stage is completed by confirming that the added raw materials for carbonization have completely caught fire. Subsequently, raw materials for carbonization are loaded and piled up in the production kiln 1 in a state of becoming even by the traveling work machine that has been on standby at the first stage 3 so as to be heaped higher than an upper end of the production kiln 1. The raw materials for carbonization to be loaded into the production kiln at this time have a moisture percentage in an unseasoned wood state, and the moisture percentage is maintained on the order of approximately 50% to 60%. If the raw materials for carbonization are in a dry state, water is sprinkled over the piled-up materials for carbonization to adjust the moisture percentage so as to become that in an unseasoned wood state. Subsequently, the whole of an upper surface of the piled-up raw materials for carbonization is pressed by using the traveling work machine into an airtight state to form a blocking layer to serve as an obstruction in introducing outside air, and a carbonization production target spot (lower-layer site of the raw materials for carbonization) is shut off from outside air by a film of steam generated with accelerated carbonization of the raw materials for carbonization maintaining a moisture percentage in an unseasoned wood state to become wet to an extent that water does not fall in drops in combination also with the outside air blocking effect, to thereby accelerate carbonization.

When the carbonization of the carbonization production target spot proceeds at a carbonization temperature of approximately 600° C. to 1000° C., the raw materials for carbonization in said spot are made into red hot carbonized materials to be reduced in volume. The upper surface of the raw materials for carbonization falls with the volume reduction. The fall of the upper surface of the raw materials for carbonization reduces the airtightness of the blocking layer to cause introduction of outside air so that combustion is promoted. When the shutter 10 is closed to prevent such a situation, exhaust gas (smoke) blows out (is discharged) from a spot of the blocking layer where the airtightness is reduced, and the part of the blow-out is appropriately pressed to secure the airtightness. The carbonization speed of the raw materials for carbonization can be controlled by the opening and closing amount of the shutter 10, and the next loading time of raw materials for carbonization is immediately before the upper surface of already-loaded raw materials for carbonization is burned. When such a state is observed, similar to the above, raw materials for carbonization a moisture percentage of which is made to be that in an unseasoned wood state are loaded and evenly laid and pressed at an upper surface using the traveling work machine to form a blocking layer so as to accelerate a carbonization processing. By repeating such a processing a plurality of times (in FIG. 1, there are three layers, which illustrates a state of three times of loading), in the production kiln 1, carbonized materials are produced in a state of being stacked upward accordingly from a lower layer.

As above, as the raw materials for carbonization to be loaded, using ones maintaining a moisture percentage in a state of unseasoned wood that is wet on the order of 50% to 60% in moisture content percentage allows further achieving higher airtightness by formation of a blocking layer by surface consolidation of the raw materials for carbonization and a film of steam that extracts water from the raw materials for carbonization while being generated by heating in the production kiln 1, to be increased in the efficiency of shutting off outside air, so that production of carbonized materials is accelerated.

When a considerable height of carbonized materials have then been produced in the production kiln 1 almost up to an upper surface of the production kiln 1 and it is judged to be at a final finishing stage, the upper surface of the raw materials for carbonization is made to completely glow. When it is judged that glowing is uneven, the surface of the raw materials for carbonization is stirred and leveled to bring out a state where uncarbonized raw materials do not remain, and water is sprinkled for extinguishing using a water supply means such as a feed pump at a point in time where the upper surface of the raw materials for carbonization began to turn white from the glowing state. At this time of sprinkling, the shutter 10 is brought into a fully open state to accelerate a drop in internal temperature. When the entire surface has then blackened, the shutter 10 is fully closed to stop discharge of exhaust gas.

Once it has been confirmed that the surface temperature of produced carbonized materials has fallen, the surface of the carbonized materials is pressed and hardened to form a blocking layer to obstruct introduction of outside air, and further, water sprinkled at the time of extinguishing forms a film of steam on an upper surface of the carbonized materials under the influence of heating of the carbonized materials to form a blocking layer in combination also with the effect of shutting off outside air, which is allowed to stand still for a while. Moreover, in order to prevent unexpected reburning due to a possible insufficiency of sprinkled water or pressing force, the surface of the carbonized materials is sequentially packed down while stepping. At this time, impurities such as stones and metal other than carbonized materials are simultaneously removed if there are any. Thereafter, the blocks B are removed from the second stage 3a to form an entrance/exit, and carbonized materials present in the production kiln 1 are carried out using the traveling work machine. Prior to this carrying-out, the shutter is brought into an open state in order to discharge a raw gas and steam that exist inside the kiln and under the bottom plate so as to accelerate discharge from the stack, which prevents the raw gas from being mixed in the carbonized materials.

In the embodiment of the present invention constituted as described above, because the production kiln 1 is repeatedly loaded with raw materials for carbonization from the side of the open ceiling surface according to a volume reduction with carbonization of raw materials for carbonization in the kiln, a large amount of carbonized materials are produced in a single production step. Because the side walls 2 and 2a of the production kiln 1 are not integrated walls made of concrete including reinforcing iron as conventionally used, but are constructed by piling up regular hexahedral cubic blocks B each having no reinforcing iron, when any of the blocks B is damaged at its exposed surface inside the kiln due to a bump or the like of a traveling work machine thereagainst, it suffices to recombine the block B such that a surface without damage is exposed. Thus, not only can the block B be recombined up to six times, but cracking of the block B at an early stage due to a difference in thermal expansion coefficient between the iron and concrete is also avoided, so that an elongated life of the production kiln 1 can be achieved.

Moreover, in the present embodiment, because the heat storage/retention member 7 is filled in the exhaust space S formed between the kiln floor iron plate 6 and the kiln bottom surface 4, heat retention of the production kiln 1 can be secured, so that a temperature fall in the production kiln 1 can be avoided in winter, on a severely cold morning or evening, while raining or snowing, or the like, which allows performing smooth accelerated carbonization.

In addition, the present invention is of course not limited to the above-mentioned embodiment, and a pair of first and second production kilns 1 and 1a can be provided adjacent to each other as in a second embodiment shown in FIG. 3 to FIG. 6. In this case, a partition wall 11 to provide a partition between the adjacent production kilns 1 and 1a is formed wide by stacking into a plurality of rows (in the present embodiment, two rows) so as to enable a traveling work machine to travel, and such an arrangement allows stably performing a necessary operation using a traveling work machine on the partition wall 11.

Moreover, in the present embodiment, the first production kiln 1 is provided with a combustion device 8 and the second production kiln 1a is not provided with a combustion device 8, an exhaust space S of the second production kiln 1a and the combustion device 8 are connected to communicate with each other via a ventilation flue 12 provided in lowermost blocks B, and the ventilation flue 12 can be adjusted in opening and closing by a shutter 13. Moreover, such an arrangement allows, when the second production kiln 1a is not in use, avoiding inflow of outside air into the combustion device 8 from the exhaust space S of the second production kiln 1a by closing the shutter 13.

Figure 7:
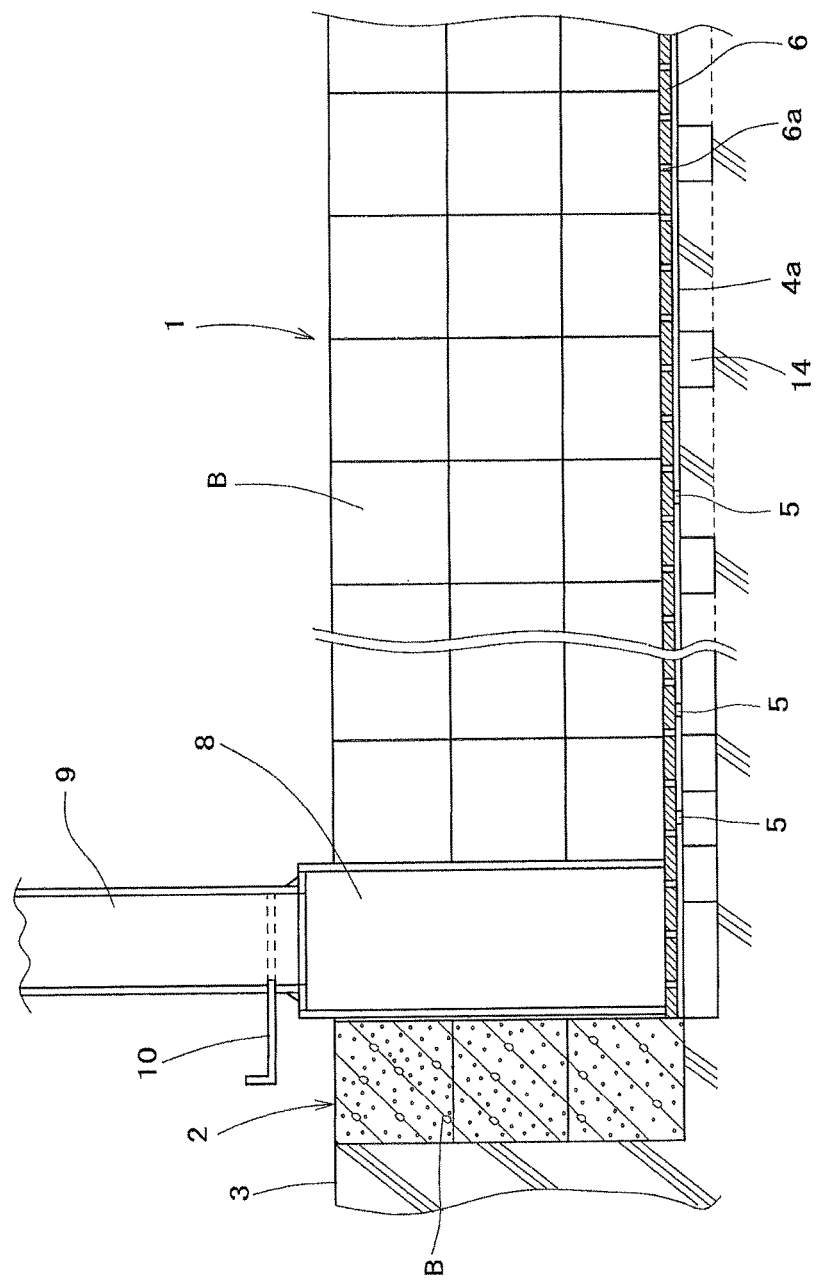
FIG. 7 is a longitudinal sectional view of a main part of a carbonized material production kiln of a third embodiment.

Further, the present invention can also be carried out as in a third embodiment shown in FIG. 7. The present embodiment has an exhaust space S formed like a grid trench 14 in the front-rear and right-left, and a kiln bottom surface 4a in a site without the grid trench 14 is formed with a slight clearance secured with respect to the kiln floor iron plate 6 so as to provide a heat storage/retention function, and a temperature fall in the production kiln 1 is thereby avoided.

Figure 8:
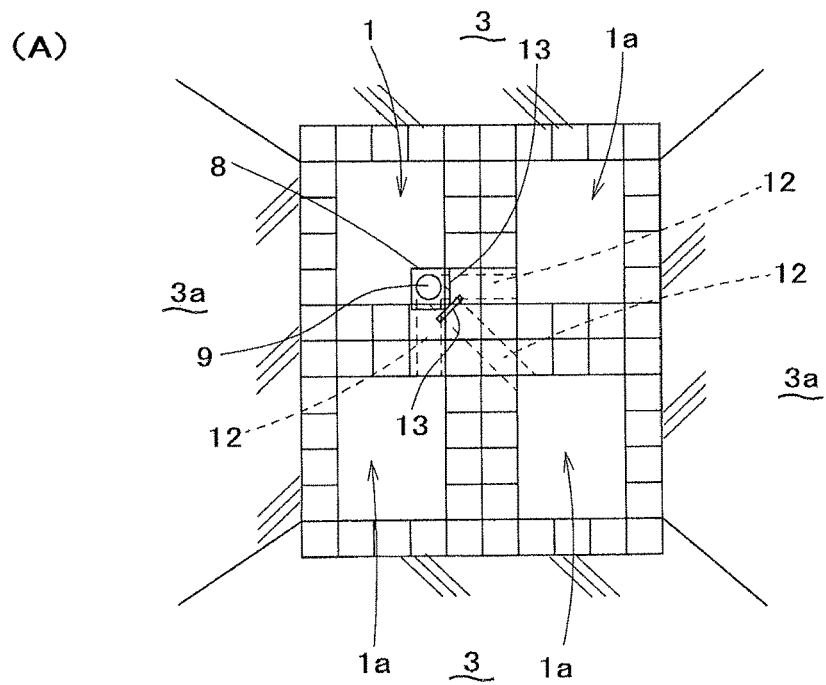
FIG. 8(A) and FIG. 8(B) are plan views of carbonized material production kilns showing fourth and fifth embodiments.
Figure 8:
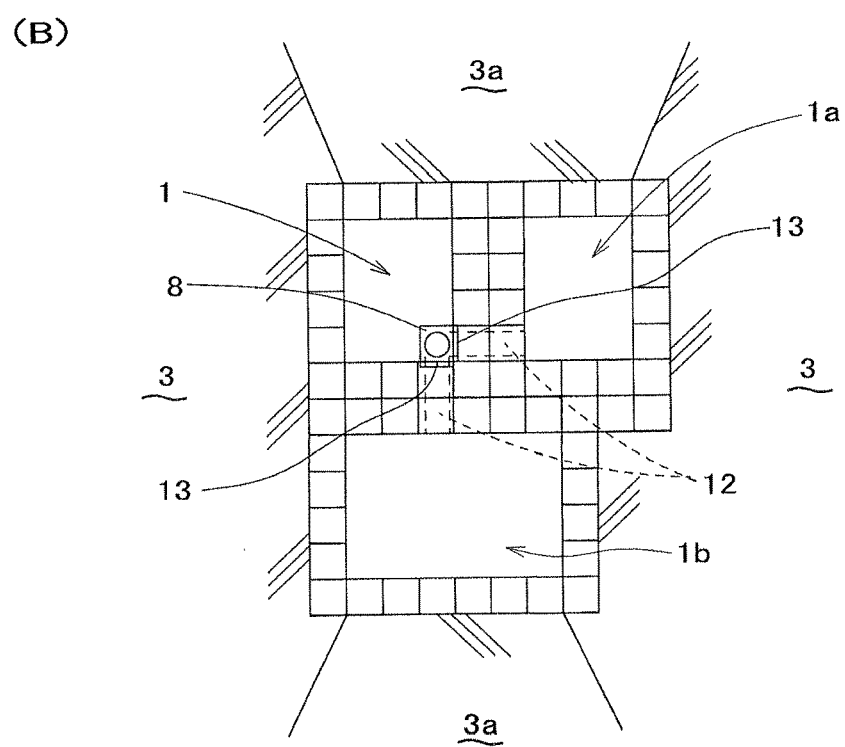

Further, the present invention can also be carried out as one for which production kilns 1 and 1a at four faces are made adjacent to each other in the front-rear and right-left as in a fourth embodiment illustrated in FIG. 8(A), and as one in which a production kiln 1b at one side is large as in a fifth embodiment illustrated in FIG. 8(B), and such combinations are arbitrary.

Figure 9:
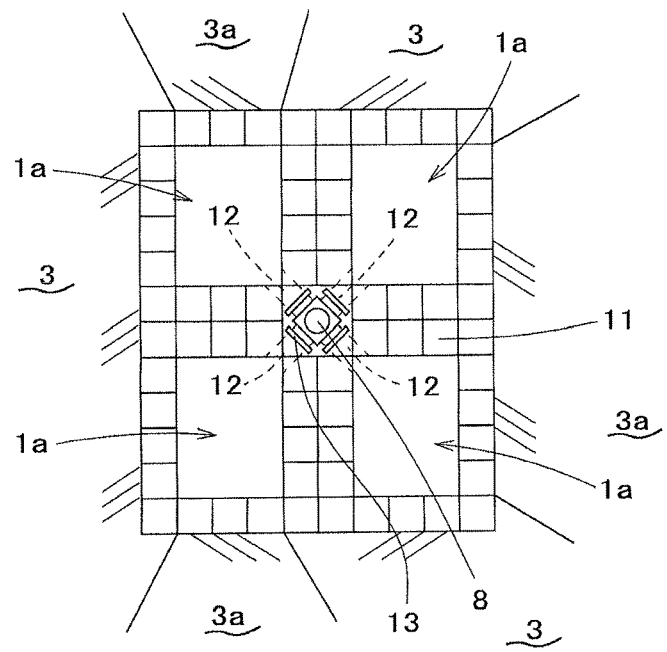
FIG. 9(A) and FIG. 9(B) are plan views of carbonized material production kilns showing sixth and seventh embodiments.
Figure 9:
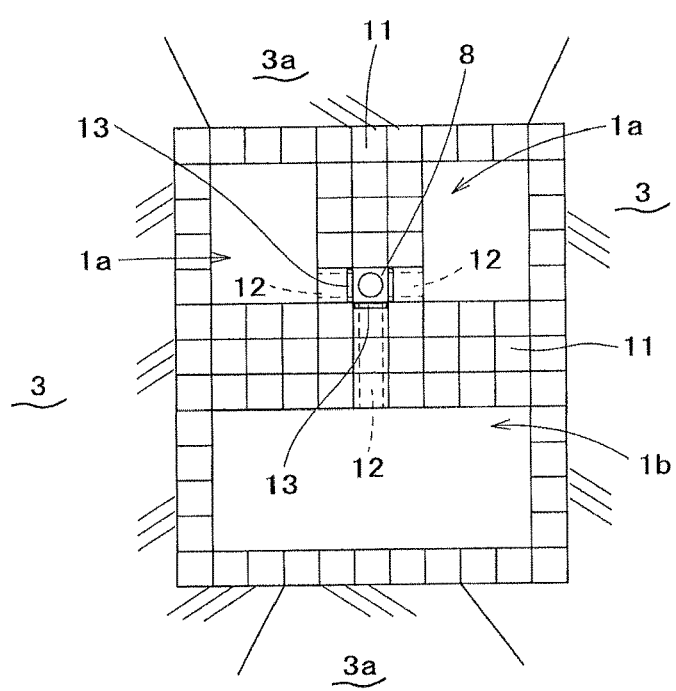

Also, in the present invention, as in sixth and seventh embodiments illustrated in FIG. 9(A) and FIG. 9(B), the partition wall 11 includes a combustion device 8, all production kilns 1a and 1b are without a combustion device, and moreover, the combustion device 8 and an exhaust space of each production kiln 1a, 1b are connected to communicate with each other via a ventilation flue 12 with a shutter 13. Such an arrangement allows, regardless of which production kiln 1a, 1b is not in use, introduction of outside air from the unused production kiln 1a, 1b into the combustion device 8 can be shut off.

INDUSTRIAL APPLICABILITY

The present invention can be applied to a field of making carbonized materials such as wood charcoal, bamboo charcoal, coconut shell charcoal, and palm empty fruit bunch charcoal that are obtained by carbonizing various plants including wood, bamboo, coconut shells, and palm empty fruit bunches, and further applied to a field of making carbonized materials of various plants including used tea leaves, used coffee grounds, and food residues produced in making food and waste, shells, and husks produced in growing and harvesting crops.

DESCRIPTION OF SYMBOLS

1 Carbonized material production kiln
2, 2a Sidewall
3 First stage
3a Second stage
4 Kiln bottom surface
6 Kiln floor iron plate
7 Heat storage/retention member
8 Combustion device
B Block
S Exhaust space

The invention claimed is:
1. A carbonized material production kiln including an open ceiling surface, side walls at four faces being in a quadrangular shape, an exhaust space which is formed between an iron plate with a vent hole opened that is laid as a kiln floor in a state of being enclosed by the side walls and a kiln bottom surface and through which exhaust gas discharged as a result of carbonization of a raw material for carbonization, a combustion device being made to communicate with the discharge space and for combusting exhaust gas, and a stage which is continuous to at least one side wall of the side walls and on which a traveling work machine can travel at the same height as that of an upper surface of the side wall, the side wall is formed by stacking blocks each being in a cubic shape and made of concrete without reinforcing iron in plural numbers horizontally and vertically to thereby make an exposed surface on the kiln side wall changeable by recombination of a block surface, and in the exhaust space between the iron plate of the kiln floor and the kiln bottom surface, a heat storage/retention member is filled in a ventable state.

2. The carbonized material production kiln according to claim 1, for which a plurality of production kilns are provided adjacent to each other via a partition side wall, said partition side wall to provide a partition between the adjacent production kilns being constructed wide by stacking blocks like a plurality of rows widthwise so as to allow a traveling work machine to travel.

3. The carbonized material production kiln according to claim 2, wherein the combustion device and the exhaust space are connected to communicate with each other via a ventilation flue provided with an opening and closing plate that is freely openable and closable.

4. The carbonized material production kiln according to claim 3, wherein the combustion device is provided in the partition side wall.

5. The carbonized material production kiln according to claim 3, wherein the combustion device is provided at a position facing the partition side wall of at least one production kiln of the plurality of production kilns, and the exhaust space of a production kiln without the combustion device and the combustion device are connected to communicate with each other via a ventilation flue provided in the partition side wall and provided with an opening and closing plate that is freely openable and closable.

* * * * *